May 27, 1930. H. FINKEN 1,760,232
PRUNING SHEARS
Filed Dec. 24, 1928
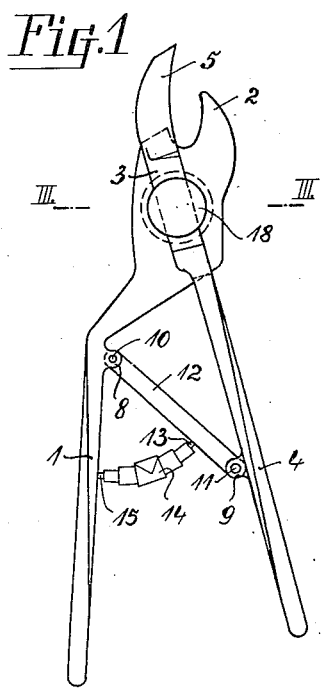
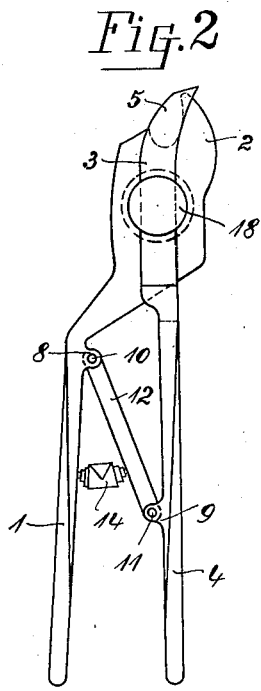
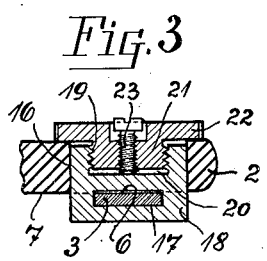
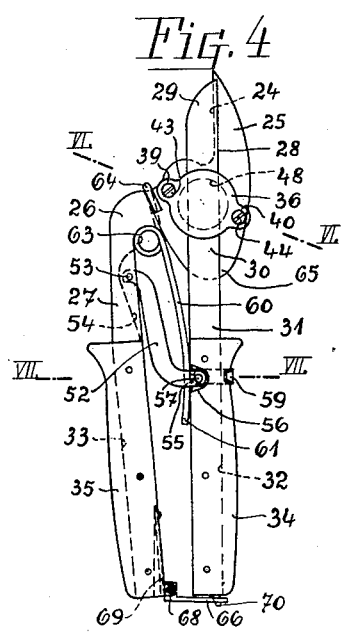
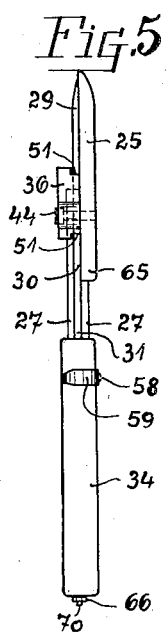
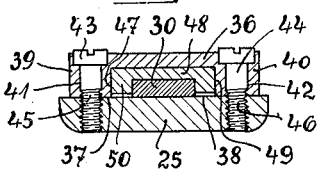
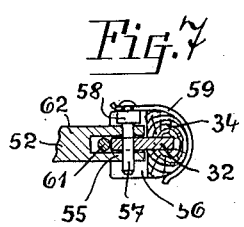
Inventor:
Hermann Finken
by [signature] attorney.

Patented May 27, 1930

1,760,232

UNITED STATES PATENT OFFICE

HERMANN FINKEN, OF RODENKIRCHEN, NEAR COLOGNE, GERMANY

PRUNING SHEARS

Application filed December 24, 1928, Serial No. 328,234, and in Germany February 26, 1927.

The present invention has reference to pruning shears and relates more particularly to that type of shears of this character in which the one shear half during the cutting movement, that is whilst the two cutting jaws approach one another, aside from this closing movement, is also longitudinally displaced relative to the other shear half, producing thereby the well known clean "drawing" cut of great power and penetration and without danger of bruising, crushing, or otherwise injuring the parts being cut, and the particular object of this invention is to improve the pivotal connection of the two shear halves by providing new and improved means for guiding the slidable shear part on the stationary shear part within the pivotal pin at the crossing of the two shear parts. Another object of the invention is to provide improved means connecting the two shear handles for controlling the relative longitudinal displacement thereof.

My invention will best be described in connection with the accompanying drawing, in which Fig. 1 is a front view of a pruning shears, embodying the invention, in open position; Fig. 2 is a similar view in closed position; Fig. 3 is a cross section on line III—III of Fig. 1; Fig. 4 is a front view of a modified construction, of which Fig. 5 is a side or edge view. Fig. 6 is a cross-section on line VI—VI of Fig. 4; Fig. 7 is a section on line VII—VII of Fig. 4.

Referring first to the constructional embodiment according to Figs. 1, 2 and 3, there are provided two crossing, relatively displaceable members or shear halves, the one, the stationary member, comprising the handle 1 and the jaw end 2, which, like the opposed other jaw, in itself may serve as shearing blade or to which a special shearing blade may be attached, and the other, the shiftable member, comprising the handle 4 and the jaw end 5. In the further description I shall, for short, designate the middle and lower portions of the blade carrying elements or shear halves as handles, and the upper portions as jaws or blades, and "stationary" and "movable" or "displaceable" refers only to the relative longitudinal displacement of the one shear member upon the other, and not to the closing or approaching movement of the two blades. The movable member is provided with an intermediate prismatic portion 3 and slidably intersects the fulcrum or pivot 18, its face 6 sliding on the face 7 of the stationary member. The handles 1 and 4 are connected by the link 12, pivoted at 10 and 11 to lugs 8 and 9 respectively extending from the handles at different distances from the shear fulcrum 18. A compression spring 13, secured on the handle 1 at 15 and to the lower part of the link 12 at 13, serves to urge the shear jaws into the open position.

The body of the stationary shear member is provided at the crossing point of the two shear halves with a circular perforation 16 for journaling the rockable pivot pin 18 provided with a longitudinal groove 17 for receiving and guiding the prismatic portion 3 of the movable member in its reciprocations. The pivot pin 18 is further provided with a countersunk depression 20 having a thread 19 into which thread the closure nut 21 whose rim 22, overlapping the perforation 16, lies on the rear face of the jaw 2, a small central set-screw 23 assuring the proper adjustment.

Upon the shears being closed, the blade 2 approaching the blade 5, there will also be imparted a longitudinal inward (in the drawing downward) displacement of the movable member 4, 5 relative to the stationary member 1, 2 due to the action of the link 12. As the prismatic portion 3 is snugly guided in the groove 17 there is no danger of the blade 5 being unduly stressed and deflected in lateral direction so that a clean drawing cut is assured.

In the modification shown in Figs. 4–7, a pruning shears is shown in which the two opposed jaws have straight cutting edges 24 and 28 respectively. The relatively stationary member is cranked or offset at 26 from the handle portion 27. The member is intersected at the crossing point or fulcrum by the relatively displaceable member 29, 30, 31 and 32. The handle portions 32 and 33 may be provided with wood or the like coverings 34 and 35 respectively (Fig. 4) for affording a good purchase.

The two shear jaws are held in operative relation by a flat cup-shaped member 36 lying with its open rim 37 against the face 38 of the blade member 25 and secured to the latter by means of screws 45 and 46 respectively, provided with heads 43 and 44, which screws pass through perforations 41 and 42 respectively provided in the rim walls 39 and 40 of the cup cover 36. Within the cup member 36 is freely rotatably arranged a disc 48 which is provided on its minor face with a prismatic guide groove 49 for guiding the correspondingly shaped section 30 of the blade 29 in its relative longitudinal and rocking displacements. By means of this arrangement the body of the blade 29 with its inner flat face 37 is held slightly rotatably, but laterally unyieldingly, against the guide face 38 of the body of the blade 25. In the annular wall 50 of the cup member 36 there are provided diametrically opposed cut-outs 51 for permitting and limiting the longitudinal and rocking displacements of the blade 29.

For bringing about the relative displacement of the two shear members they are operatively connected by the link 52, whose upper end (Fig. 4) is pivotally secured at 53 to the handle portion 27 provided at this place with a recess 54, and whose lower, forked end 55 extends into a recess 56 in the wooden handle cover 34 and straddles the handle part 32 and is pivotally connected thereto by the pin 57. The latter is preferably held in place for ready disengagement by a curved leaf spring 59 acting on the pin head 58 and clipped onto the handle. This enables the quick removal of the blade 29, so that it can then be used as an ordinary knife.

The spring 60 urging the two shear halves into the open position extends with its lower free end through the forked end 62 of the link 52 (Fig. 7) and lies against the portion 31, 32 of the movable shear member. Intermediate its ends the spring 60 is coiled as at 63, fitting closely into the hollow formed by the cranked-off portion 26 of the stationary shear member, and the upper spring end 64 is hooked over this shear member, as clearly shown in Fig. 4.

For giving the blade 29 a more effective and stable bearing surface the blade body 25 is provided with a body extension 65.

During non-use the shear halves are locked in the closed position by means of a shackle or strap 66, whose angularly bent-off end is pivotally secured at 68 to the handle 33, 35 and is influenced by a leaf spring 69, and whose other perforated end can be brought into, or out of, closing cooperation with a stud or button 70 extending from the handle 32, 34.

I claim:

1. A spring shears of the type set forth, comprising a pair of shear members crossing each other, means at the crossing point for pivotally connecting the said members for operative reciprocation, and means for permitting and controlling longitudinal reciprocal displacement of the one shear member upon, and relative to, the other shear member, comprising a link member pivotally secured at its higher extremity to the relatively stationary shear member, and at its lower extremity to the relatively displaceable shear member, and means for urging the said shear members into the open position, the said pivotal means comprising a disk having a longitudinal prismatic guide groove, a cup-shaped cover member housing said disk for free relative rotary reciprocation therein, and means detachably securing said cover to the relatively stationary shear member.

2. In a spring shears according to claim 1, the feature that the longitudinal prismatic guide groove in the rotary disc is formed in the side of said disc facing the relatively stationary shear member and the relatively displaceable shear member has a flat surface turning and sliding in contact with said stationary member.

3. In a spring shears according to claim 1, the feature that the body of the relatively displaceable shear member is flat and of straight conformation and of prismatic cross-section in alinement with the straight blade end thereof and for sliding engagement with said prismatic guide groove.

4. In a spring shears according to claim 1, the feature that the lower extremity of the link member connecting the two shear members has a positive, quick-detachable connection with the relatively displaceable shear member for the ready slidable removal of the latter from the guide grove in the pivotal connection.

5. In a spring shears according to claim 1, the feature that for the purpose of affording an effective bearing surface and providing a seat for the coil portion of the opening spring, the relatively stationary member has a laterally offset portion connecting its blade portion with its handle portion and the blade portion extending below the crossing point of the two shear members to form with said offset portion a seat recess for said coil portion of the spring.

HERMANN FINKEN.